A. E. NAYLOR & J. C. Y. MOORE.
HARROW.
APPLICATION FILED JUNE 11, 1910.

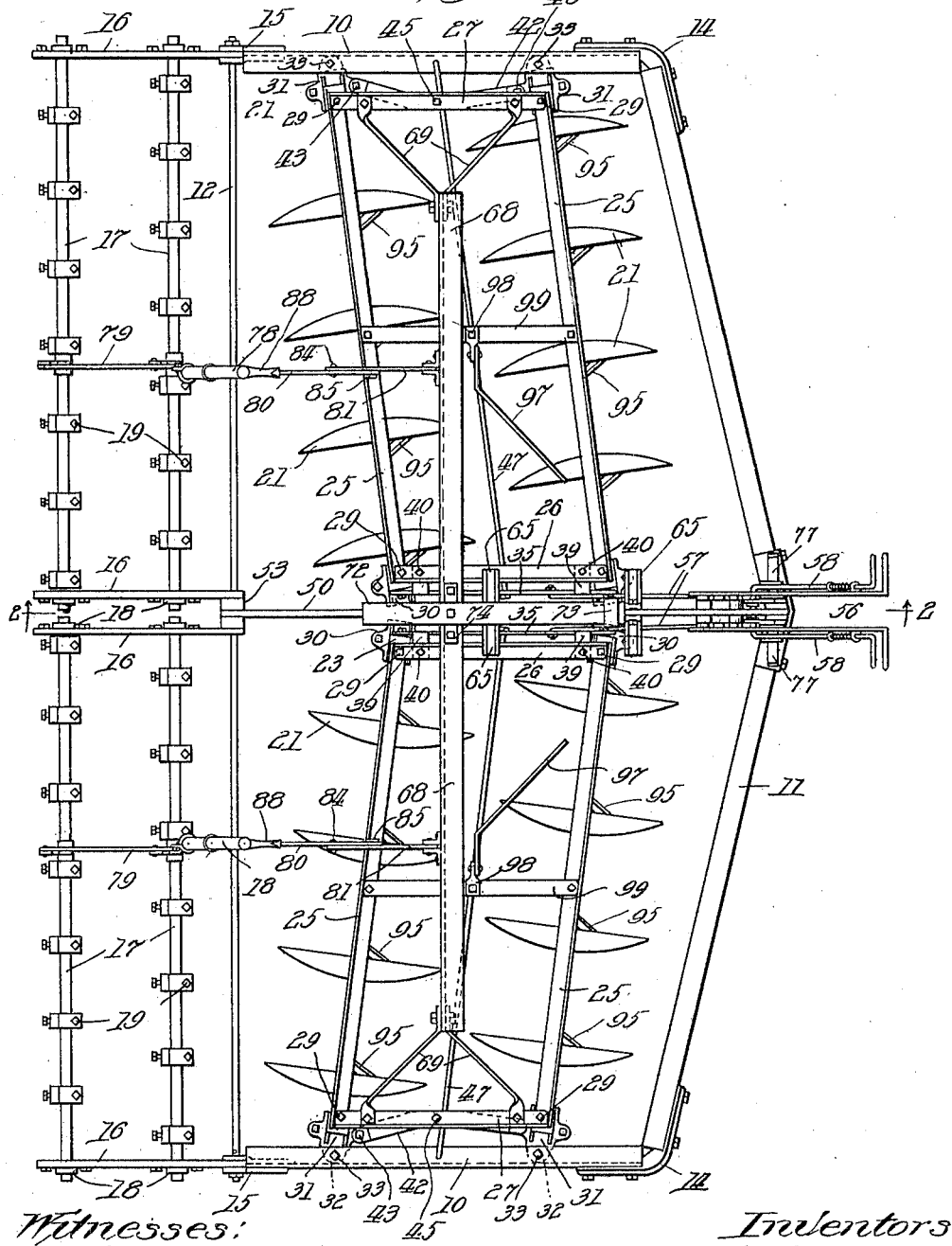

986,745.

Patented Mar. 14, 1911.

3 SHEETS—SHEET 2.

Witnesses:
Harry S. Gaither
William Goldberger

Inventors
Alfred E. Naylor
John C. Y. Moore
by William L. Hall.
atty

A. E. NAYLOR & J. C. Y. MOORE.
HARROW.
APPLICATION FILED JUNE 11, 1910.
986,745.
Patented Mar. 14, 1911.
3 SHEETS—SHEET 3.
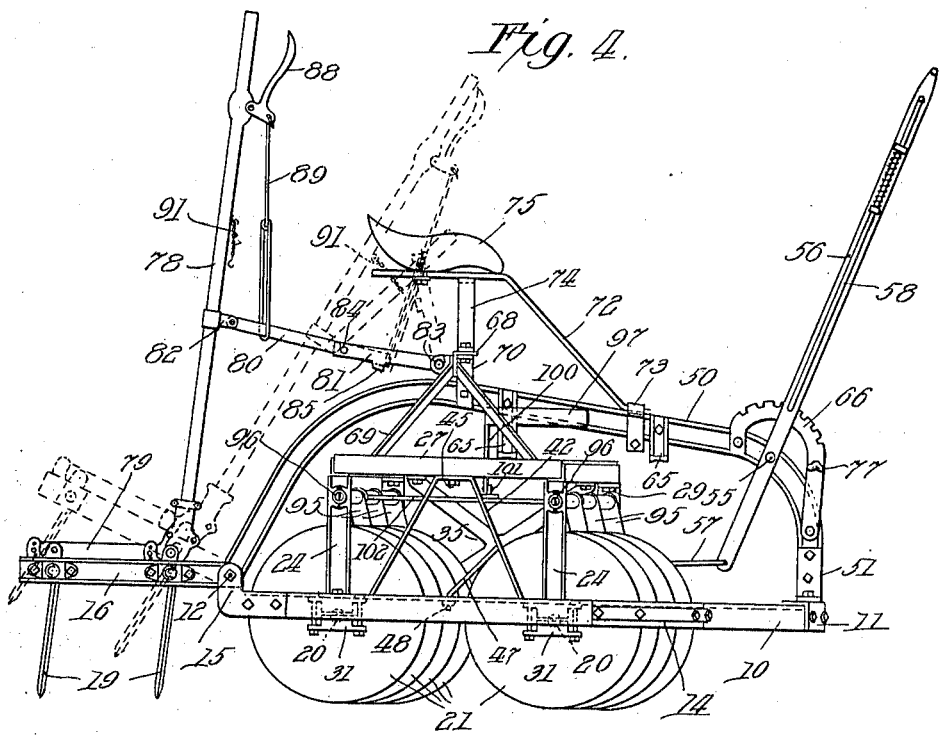
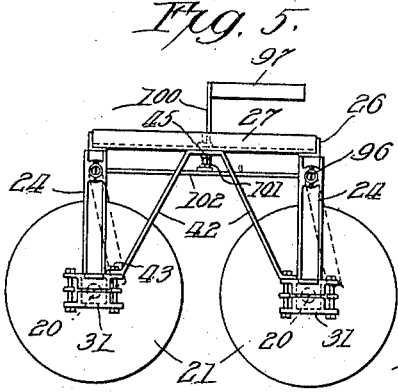
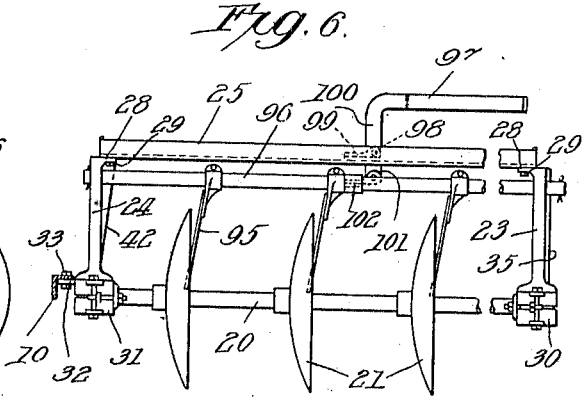
Witnesses:
Harry S. Gaither
William Goldberger.
Inventors
Alfred E. Naylor
John C. Y. Moore
by William L. Hall
Atty

UNITED STATES PATENT OFFICE.

ALFRED E. NAYLOR, OF PLANO, AND JOHN C. Y. MOORE, OF LA GRANGE, ILLINOIS, ASSIGNORS TO NAYLOR MANUFACTURING COMPANY, OF LA GRANGE, ILLINOIS, A CORPORATION OF ILLINOIS.

HARROW.

986,745.  Specification of Letters Patent.  Patented Mar. 14, 1911.

Application filed June 11, 1910.  Serial No. 566,323.

*To all whom it may concern:*

Be it known that we, ALFRED E. NAYLOR, a citizen of the United States, and a resident of Plano, in the county of Kendall and State of Illinois, and JOHN C. Y. MOORE, a citizen of the United States, and a resident of La Grange, in the county of Cook and State of Illinois, have invented certain new and useful Improvements in Harrows; and we do hereby declare that the following is a full, clear, and exact description thereof, reference being had to the accompanying drawings, and to the characters of reference marked thereon, which form a part of this specification.

This invention relates to improvements in disk and other harrows, and the invention consists in the matters hereinafter set forth and more particularly pointed out in the appended claims.

In the drawings, Figure 1 is a plan view of a harrow embodying our invention. Fig. 2 is a section on the line 2—2 of Fig. 1. Fig. 3 is a section on the line 3—3 of Fig. 2. Fig. 4 is an end view of the harrow. Fig. 5 is an end view of one of the swinging disk shaft frames with the end member of the main harrow frame omitted. Fig. 6 is a broken rear view of one of the swinging disk shaft frames.

Our invention is shown as embodied in a combined rolling disk and tooth harrow, the latter arranged in rear of the former to smooth the ground over which the disks roll. The disk harrow comprises a single main frame consisting of the end members 10, 10, the front member 11 and the rear member 12. The end and front members are shown as made of angle bars which are connected at the front corners of the harrow by the straps 14. The rear member 12 consists, as herein shown, of a rod which extends at its ends through the upturned brackets 15, 15 at the rear ends of the end members. To the said rod 12 is loosely or pivotally connected the two sections of an auxiliary or tooth harrow, each comprising the end members 16, 16, which are apertured at their forward ends for the passage of the rod 12 therethrough, and the tooth carrying shafts 17, 17 which are mounted at their ends in the bearing boxes or castings 18, 18 carried by the end members of the tooth sections. The teeth 19 of the tooth sections may be fixed to the shafts 17, 17 in any suitable manner.

Arranged at each side of the center of the main frame of the harrow is a pair of disk shafts 20, 20, the shafts of each pair being arranged one in front of the other. Each pair of disk shafts is carried by a horizontally swinging frame, one at each side of the center of the main frame. The said disk shafts carry a familiar form of concavo-convex disks 21 which are attached to the shafts in any suitable manner, and constitute harrow gangs with the disks, or other soil cultivators, of the shafts of each pair of shafts arranged out of line with each other. Each frame consists of the inner end standards 23, 23, (Figs. 1, 2 and 6) the outer end standards 24, 24, (Figs. 1, 4, 5 and 6) the front and rear horizontal members 25, 25 and the transverse, horizontal end members 26, 27. The said longitudinal and transverse members of each frame constitute a parallelogram and are supported on the upper ends of the inner and outer standards 23 and 24. The said members are loosely connected to each other and to inwardly turned lugs 28 at the upper ends of the standards by the bolts 29.

The disk shafts 20 are mounted at their ends in divided bearing boxes 30, 31 carried by the lower ends of the standards 23, 24, respectively, the upper halves of said boxes being herein shown as made integral with said standards. The bearing boxes 31 associated with the outer standards 24 are hinged or pivoted to the end members 10 of the main harrow frame to permit the swinging, disk carrying frames to be horizontally swung from front to rear of the harrow at the inner ends of said frames to vary the angle of incidence of the disks to the soil relatively to the path of the harrow. The hinge or pivot connection of said outer boxes 31 with the main frame consists of lugs 32 made integral with the upper members of the boxes and arranged in underlapping relation to the inwardly projecting flanges of the angle bar end members of the harrow frame, and pivot bolts 33 which extend through the lapping lugs and flanges, as best shown in Figs. 1 and 6. The inner boxes 30 of the swinging frame are unsupported by the harrow frame.

The inner ends of the supplemental swinging frames are braced by the cross shaped braces 35, the lower arms 36 of which are loosely attached by the bolts 37 to the lower ends of the standards 23, and the upper arms 38 of which are provided with the inturned lugs 39 that extend under the adjacent transverse end members 26 of the swinging frame and are loosely attached thereto by the bolts 40 (Fig. 1). The outer ends of the swinging, disk carrying frames are likewise braced by the inverted V-shaped braces 42, the lower ends of the arms of which are attached to the shaft bearing boxes 31 by the bolts 43, and the upper or closed portions of which are loosely attached to the end members 27 of the swinging frame by means of the bolts 45. The braces 35 at the inner ends of the swinging frames are tied to the outer members 10 of the main frame by the tie rods 47 which are connected centrally to the braces 35 and extend downwardly and outwardly in opposite directions and are attached to the end members 10 by the nuts 48 (Figs. 1 and 4).

50 designates an arch bar arranged centrally between the ends of the main frame. The said arch bar extends from front to rear of the frame above the level of the disk carrying frames, and is rigidly attached at its front end to the front member 11 of the main frame by the angle pieces 51, 51. The arch bar is provided at its rear end with a transverse opening through which extends the rear rod member 12 of the main frame. The said rear end of the arch bar is located between the inner ends of the tooth harrow sections, and is spaced from the inner end members 16 thereof by the spacing sleeves 53, as shown in Fig. 1. Pivoted to the said arch bar by means of the pivot pin 55 are two adjusting levers 56, 56, each of which is connected at its lower end by a link 57 with the end brace 36 of one of the swinging disk carrying frames, as most clearly shown in Figs. 1 and 2. The said levers carry spring-pressed latches 58, 58, provided with the lower inturned ends 59, 59 that extend through slots in said levers and in guides 60 attached to the inner sides of the levers; and said inturned ends of the latches are adapted for engagement with the notches of notched sectors 61 attached to the opposite sides of the arch bar. It is through the medium of said levers 56 and the links 57 that the inner or non-supported ends of the swinging disk carrying frames are horizontally adjusted about their pivots 33 so as to vary the angle of the disk carrying shafts to the path of the harrow, and by which said frames are locked in adjusted positions. The swinging movement of the disk carrying frames about their pivots 33 to adjust the inner ends of the disk carrying shafts from front to rear of the frame is permitted by reason of the loose connection of the longitudinal and transverse members of the frames at the bolts 29, and also the loose connection of the end braces 35 and 42 with the said swinging frames. The said swinging disk carrying frames are swung or adjusted forwardly at their inner ends by the positive action of the adjusting levers 56. They may be allowed to swing or drag rearwardly at their inner ends to adjust the angle of the shaft disks, at a time when the harrow is being drawn forward in the field, by merely releasing the spring-pressed latches 58 of said levers.

The inner ends of the disk carrying frames are prevented from rising by means of the down holding bearers 65, 65 attached to the arch bar and extending in opposite directions transversely above the inner members 26 of the swinging frames. There may be two pairs of these bearers, one pair arranged at a suitable distance in front of the other, so that at least one pair of bearers will engage and hold from rising the inner ends of the swinging frames in all positions of adjustment of said frames.

Located above the swinging frames and extending longitudinally of the main harrow frame is a seat supporting bar 68 that is attached at its outer ends, by means of the oblique standards 69, 69, to the outer, upper members 27 of the swinging, disk carrying frames, and is attached at its center by means of the short strut 70 to the arch bar 50.

72 designates a seat bar that is attached at its forward end, by means of the clip 73, to the arch bar, and is supported at its rear end by means of the arched standard 74 upon the seat supporting bar 68. On the rear, horizontal end of the seat bar 72 is adjustably supported a seat 75. Foot rests 77, 77 are carried by the forward end of the arch bar in convenient access to the seat 75. Said foot rests are herein shown as cast integral with the castings of the notched segments for the levers 56.

The tooth harrow sections at the rear of the harrow are adapted to be swung upwardly about the rear rod member 12 of the main frame as a pivot by the levers 78, 78, provided at their lower ends with the rigidly attached, horizontal members 79 that extend transversely across and are fixed in any suitable or convenient manner to the tooth carrying bars of the tooth sections. Said levers 78 are connected to the seat supporting bar 68 by means of the toggle arms 80 and 81, the former of which are pivoted to the lugs 82 carried by said levers and the latter of which are pivoted to the lugs 83 carried by the seat supporting bar. Said arms overlap at their inner ends and are pivoted to each other at their overlapping parts by the pivot bolts 84. The arms 81 are provided with lateral lugs 85 which engage the free or inner ends of the arms 80 in a manner to lock the toggle arms in the position shown in Figs. 2 and 4. In this position of the toggle arms 80 and 81, the jointed or connected ends of the arms are depressed slightly below planes passed through the outer pivots of said arms. The stop lug 85 prevents the toggle arms from breaking downwardly, and the fact that the pivots 84 of said arms are below planes passed through the outer pivots thereof, said toggle arms are prevented from breaking or flexing upwardly. Thus it will be seen that when the toggle arms are in the position shown in Figs. 2 and 4, the tooth harrow sections will be locked down in their lower positions in contact with the soil and held from rising.

The arms may be flexed upwardly to permit the tooth sections to be raised by their raising levers 80, through the medium of finger levers 88 and links 89 connecting said finger levers with the toggle arms 80. When the toothed harrow sections are raised above the ground to the dotted line position indicated in Fig. 4, they are held in this position by means of the chains and hooks 91 that are attached to the levers, the hooks being adapted to engage over the upwardly broken or flexed toggle arms 80 to hold the toggle arms in their closed positions, and thereby hold the tooth harrow sections away from the ground.

The disks may be cleaned by means of the scraping knives 95, 95 which extend downwardly from shafts 96, 96 supported above the disks in the standards 23, 24 of the disk carrying frames, there being one scraping knife or bar at the concave side of each disk. Said scraping knives are normally separated from the disks but are adapted to be thrown against the upper edges thereof by endwise movement of the shafts 96 in their bearings in the standards 23 and 24. The pair of scraping knife carrying shafts of each swinging frame is thus moved endwise by a common actuating lever 97. The lever of each pair of said scraping knife shafts is made of general L-shape and is pivoted to a lug 98 fixed centrally to a bar 99 which extends transversely between and is attached at its ends to the longitudinal members of the swinging disk carrying frame. The short arm 100 of the L-shaped lever is in turn pivoted to a lug 101 that is carried by or fixed to a bar 102 which extends transversely between and is connected in any suitable manner at its ends with the knife carrying shafts 96 (Figs. 2, 5 and 6). The free ends of said levers 97 are directed obliquely forwardly in position to be readily engaged by the foot of the person sitting on the seat 75. With this construction, when the free ends of the L-shaped levers 97 are depressed, the shafts 96 are moved endwise in their bearings to carry the knives 95 against the upper edges of the disks at the concave sides thereof in a manner to clean the disks.

A general advantage of the construction described is that the central part of the harrow, or the portion between the two sets of disks, is open and unobstructed, so as to offer no opportunity for material to collect beneath the center of the harrow in a manner to clog the same. When the harrow is adjusted as shown in Fig. 1, with the concave sides of the disks facing inwardly, the said disks throw the soil from the ends of the harrow inwardly. In prior constructions of harrows of this general nature, where the inner ends of the disk shafts are supported by the main frame of the harrow, it has been found that weeds or trash thrown inwardly by the disks tend to and do collect beneath the central part of the frame so as to require constant attention to keep the harrow clean. Furthermore by reason of the absence of intermediate frame members on which to support the bearings for the inner ends of the shaft, the bearing boxes for the shafts may be placed closer together, with the result that the inner or adjacent disks of the two lateral sets of disks may be arranged closer together than where intermediate frame members are employed. The employment of the arch bar, upon which are mounted the disk frame adjusting levers and the seat, greatly simplifies the construction of the harrow, reduces its cost and makes the adjustment of the harrow a simple and most convenient operation. The employment of the bearers 65 which operate to hold down the inner ends of the disk carrying frames, in connection with the seat supporting bar that is supported at its ends on said frames and at its center on said arch bar, has the effect of uniformly distributing the weight of the load on the disks and prevents the weight of the rider from forcing the outer disks too deeply into the soil and correspondingly raising the inner disks.

It is manifest that the structural details of the harrow are capable of variation within the spirit and scope of our invention.

While the invention is shown as embodied in a disk harrow, it is to be understood that certain of the features thereof are not necessarily limited to such a harrow but may be applied to a harrow having other forms of soil cultivating devices.

We claim as our invention:—

1. A harrow comprising a main frame, supplemental frames pivotally supported at their outer ends on the main frame to swing horizontally at their inner ends and non-supported at their inner ends, an arch bar extending from front to rear of the main frame over the inner ends of the supplemental frames, soil cultivating means carried by the supplemental frames, and means carried by the arch bar for adjusting the swinging ends of the supplemental frames and for locking them in adjusted positions.

2. A disk harrow comprising a main frame, shafts mounted in said frame and pivotally supported at their outer ends on the main frame to swing forwardly and rearwardly at their inner ends, and unsupported at their swinging ends, disks carried by said shafts, a centrally arranged arch bar extending from front to rear of the main frame over the inner ends of said shafts and means carried by the arch bar for adjusting the swinging ends of said shafts and for locking the shafts in adjusted positions.

3. A disk harrow comprising a main frame, two swinging disk carrying frames pivotally supported at their outer ends on the main frame to swing horizontally at their inner ends from front to rear of the main frame, and non-supported at their inner ends, shafts rotatively mounted in said swinging frames, disks carried by said shafts, a centrally located arch bar extending from front to rear of the main frame over the disk carrying frames and means carried by said arch bar for adjusting the inner ends of the frames about their pivots and locking said frames in adjusted position.

4. A disk harrow comprising a main frame, two swinging disk carrying frames pivotally supported at their outer ends on the main frame to swing horizontally at their inner ends from front to rear of the main frame, and non-supported at their inner ends, shafts rotatively mounted in said swinging frames, disks carried by said shafts, a centrally located arch bar extending from front to rear of the main frame over the disk carrying frames, means carried by said arch bar for adjusting the inner ends of the frames about their pivots and locking said frames in adjusted position, and means carried by said arch bar for preventing the inner ends of said swinging disk carrying frame from rising.

5. A disk harrow comprising a main frame, two swinging disk carrying frames pivotally supported at their outer ends on the main frame to swing horizontally at their inner ends from front to rear of the main frame, and non-supported at their inner ends, shafts rotatively mounted in said swinging frames, disks carried by said shafts, a centrally located arch bar extending from front to rear of the main frame over the disk carrying frames, adjusting levers pivoted to the arch bar and connected to the inner ends of said swinging frames and means carried by said arch bar for locking said levers in adjusted positions.

6. A disk harrow comprising a main frame, two swinging disk carrying frames mounted therein, one at each side of the center of the main frame, each of said swinging frames comprising inner and outer standards and horizontal and transverse frame members arranged in the form of a parallelogram and loosely connected to each other and to the upper ends of said standards, bearing boxes carried by said standards, front and rear shafts for each swinging frame mounted in said bearing boxes and provided with disks, the outer ends of said swinging frames being pivoted to the main frame to permit the inner ends of said frames to swing forwardly and rearwardly and the inner ends of said swinging frames being non-supported from the main frame, and means carried by the main frame, intermediate its ends, for adjusting the swinging ends of the disk carrying frames and for locking them in adjusted positions.

7. A disk harrow comprising a main frame, two swinging disk carrying frames mounted therein, one at each side of the center of the main frame, each of said swinging frames comprising inner and outer standards and horizontal and transverse frame members arranged in the form of a parallelogram and loosely connected to each other and to the upper ends of said standards, bearing boxes carried by said standards, front and rear shafts for each swinging frame mounted in said bearing boxes and provided with disks, the outer ends of said swinging frames being pivoted to the main frame to permit the inner ends of said frames to swing forwardly and rearwardly and the inner ends of said swinging frames being non-supported from the main frame, a centrally arranged arch bar extending from front to rear of the main frame over the inner ends of the swinging frames, adjusting levers pivoted to the arch bar and connected to the inner ends of the swinging frames and means carried by the arch bar for locking the levers in adjusted positions.

8. A disk harrow comprising a main frame, two swinging disk carrying frames mounted therein, one at each side of the center of the main frame, each of said swinging frames comprising inner and outer standards and horizontal and transverse frame members arranged in the form of a parallelogram and loosely connected to each other and to the upper ends of said standards, bearing boxes carried by said standards, front and rear shafts for each swinging frame mounted in said bearing boxes and provided with disks, the outer ends of said swinging frames being pivoted to the main frame to permit the inner ends of the frames to swing forwardly and rearwardly and the inner ends of said swinging frames being non-supported from the main frame, means carried by the main frame, intermediate its ends, for adjusting the swinging ends of the disk carrying frames and for locking them in adjusted positions, and downwardly facing bearers attached to the arch bar and extending in opposite directions therefrom over the inner ends of the disk carrying frames to prevent the latter frames from rising.

9. A harrow comprising a main frame, supplemental frames pivotally supported at their outer ends on the main frame to swing horizontally at their inner ends and non-supported at their inner ends, an arch bar extending from front to rear of the main frame over the inner ends of the supplemental frames, soil cultivating means carried by the supplemental frames, means carried by the arch bar for adjusting the swinging ends of the supplemental frames and for locking them in adjusted positions, and a seat supported on said arch bar and on said supplemental frames.

10. A harrow comprising a main frame, two supplemental frames pivotally supported at their outer ends on the main frame to swing horizontally at their inner ends and non-supported at their inner ends, soil cultivating means carried by the supplemental frames, a seat supporting bar extending over and supported at its ends on the pivoted ends of the supplemental frames, and means carried by a part stationary with the main frame for adjusting the inner ends of the supplemental frames and for locking said frames in adjusted positions.

11. A disk harrow comprising a main frame, two swinging, disk carrying frames pivotally supported at their outer ends on the main frame to swing horizontally at their inner ends from front to rear of the main frame, and non-supported at their inner ends, shafts rotatively mounted in said frame, disks carried by said shafts, a centrally located arch bar extending from front to rear of the main frame over the disk carrying frames, means carried by said arch bar for adjusting the inner ends of the frames about their pivots and locking said frames in adjusted position, and a seat supporting bar extending over and supported at its ends on the swinging frames, and supported intermediate its ends on the arch bar.

12. A disk harrow comprising a main frame, two swinging, disk carrying frames pivotally supported at their outer ends on the main frame to swing horizontally at their inner ends from front to rear of the main frame, and non-supported at their inner ends, shafts rotatively mounted in said frame, disks carried by said shafts, a centrally located arch bar extending from front to rear of the main frame over the disk carrying frames, means carried by said arch bar for adjusting the inner ends of the frames about their pivots and locking said frames in adjusted position, a seat supporting bar extending over and supported at its ends on the swinging frames and supported intermediate its ends on the arch bar, and means carried by the arch bar for preventing the inner ends of the swinging disk carrying frames from rising.

13. A disk harrow comprising a main frame, a swinging disk carrying frame pivoted to the main frame, a shaft mounted in said swinging frame, disks carried by said shaft, means for adjusting the swinging end of the disk carrying frame for varying the angle of presentation of the disks to the soil and for locking the frame in adjusted positions, and a tie rod extending between and connecting the swinging end of the disk carrying frame with the end member of the main frame.

In testimony, that we claim the foregoing as our invention we affix our signatures in the presence of two witnesses, this 28th day of May A. D. 1910 and the 25th day of May, 1910.

ALFRED E. NAYLOR.
JOHN C. Y. MOORE.

Witnesses to signature of Naylor:
  W. J. Pope,
  E. W. Rice.

Witnesses to signature of Moore:
  W. Goldberger,
  W. L. Hall.

---

Copies of this patent may be obtained for five cents each, by addressing the "Commissioner of Patents, Washington, D. C."